United States Patent Office 2,934,434
Patented Apr. 26, 1960

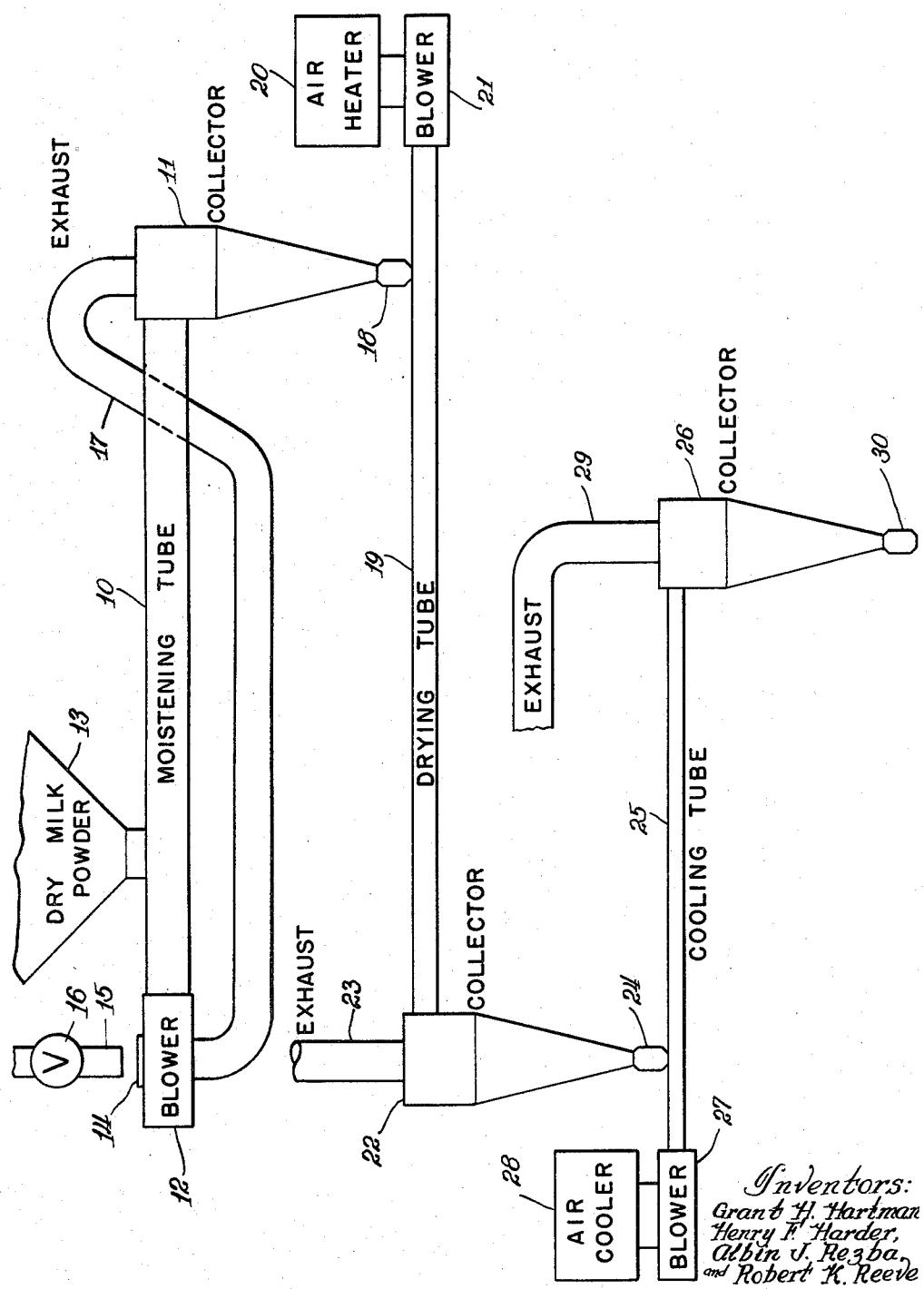

2,934,434

METHOD AND APPARATUS FOR PRODUCING CLUSTERS OF LACTEAL MATERIAL

Grant H. Hartman, Henry F. Harder, and Albin J. Rezba, Manitowoc, and Robert K. Reeve, Cato, Wis., assignors to Cherry-Burrell Corporation, Chicago, Ill., a corporation of Delaware Application January 3, 1955, Serial No. 479,402

8 Claims. (Cl. 99—56)

Our invention relates to the manufacture of soluble dried dairy products and the like, and has reference more particularly to quickly dispersible non-fat dry milk solids and a process and apparatus for making same.

Fluid skim milk is available commercially in considerable quantities because of the large amounts of residual skim milk from which the fat has been removed for making butter. However, because of its perishable nature and the volume of storage space it would require in its fluid condition, the practice has become widespread of converting excess skim milk into dry powder both for convenience in storage and to preserve the non-fat solids of the milk.

Dry milk powder, by which we mean particularly non-fat dry milk solids, is finding an increasingly large consumer market because of relatively low cost, high nutritional value of the non-fat milk solids, and the convenience of keeping milk powder in space-saving form on the pantry shelf without risk of its turning sour.

The dry skim milk powder presently on the market has encountered sales resistance because of the difficulty of dissolving it in water, with which it is mixed in the home to produce a reconstituted skim milk. Most commercial skim milk powder is highly hygroscopic, resulting from the presence of a large proportion of anhydrous lactose. Thus when the milk powder is mixed with water, it forms a doughy-like outer wall which resists any further moisture penetration, thus leaving a core or lump of undissolved powder at the center. The resulting lumpiness is difficult to overcome unless the water and the milk powder are vigorously mixed mechanically.

Because of its hygroscopic character, the dried skim milk in powder form tends to absorb moisture out of the air if a package of it is left open for any length of time such as on the pantry shelf, and this results in caking and hardening of the powder.

These difficulties have delayed consumer acceptance of dry milk powder and it is these difficulties which we have sought to overcome.

The principal object of our invention, therefore, is to produce a dry milk product or the like which is instantly dispersible in water and dissolves quickly therein.

It is also an object of our invention to produce a dried milk product in which the particles are sufficiently clustered so that even though the particles are hygroscopic they can remain exposed to air for long periods of time without caking or lumping to the extent that it interferes with its use.

It is another object of our invention to develop a simple and inexpensive method of incorporating moisture in dried milk or the like to cause clustering of particles with milk powder and the like.

Another object of our invention is to dry the moist, clustered milk particles in such a manner so as to produce a hygroscopic product, with minimum lactose crystallization.

And it is a still further object of our invention to provide facilities for the aforesaid purposes which can be used to supplement existing commercial milk drying equipment so as to permit convenient conversion to the manufacture of a dispersible, substantially non-caking product, or which can be set up separately to process previously made dry milk powder, these and other objects being accomplished as hereinafter described, reference being had to the accompanying drawing in which The figure is a diagrammatic representation of a system of apparatus for treating dry milk powder in accordance with our invention.

Referring now to the drawing, the first stage of the process embodying our invention involves a moistening tube which is designated generally by the reference numeral 10. This tube is preferably of stainless steel to comply with sanitary requirements and terminates at one end in a collector 11 and at the opposite end in a blower 12. Between the collector 11 and the blower 12 and adjacent the latter, a source 13 of dry milk powder is provided. The source 13 may be a hopper as shown diagrammatically in the drawing, or it may be the base of a collector in which dry milk powder is received at the end of a commercial milk drying system, or it may be a duct with a screw feed which serves to deliver milk powder to the moistening tube 10. The blower 12 is preferably of the centrifugal type adapted to deliver a steady supply of air to the moistening tube 10 and said blower 12 has an opening 14 at one side which serves as an air inlet. A steam pipe 15 is located near and aimed toward the opening 14 and is provided with a control valve 16 to regulate the flow of steam through said pipe 15.

The collector 11 is preferably of the "cyclone" type commonly used in the drying industry and is of inverted conical form with an air exhaust 17 at the top thereof to permit escape of air. The moistening tube 10 communicates substantially tangentially with the collector 11 near the top thereof so that air and product discharged from the moistening tube 10 into the collector 11 is given a circular motion therein.

The length of the moistening tube 10 is dependent upon the quantity of product to be treated and also the velocity of air and product passing therethrough. We have found that a tube length between the source of dry milk powder 13 and the collector 11 should be approximately 25 feet, although we have had successful operation with moistening tube lengths of from 10 to 30 feet. The diameter of the moistening tube 10 depends largely on the volume of product to be processed but we have found a diameter of 12 inches to be desirable in order to process 2000 pounds of dry product per hour.

A valve 18 is provided at the tapered bottom of the collector 11, and as the air from the moistening tube 10 escapes from the collector 11 through the exhaust 17 at the top, the product being heavier, tends to drop into said valve 18 from which it is discharged into the drying tube 19. The air exhaust 17 is connected to the blower 12 at the side thereof opposite the opening 14 and recirculates the humid air from the collector 11 back to the blower 12 for utilization again in moistening tube 10.

An air heater 20 and a blower 21 which draws air in through the air heater 20 are connected to the drying tube 19 adjacent the valve 18. The air heater 20 may be of the steam coil or gas furnace type, although any heating facilities capable of raising the temperature of air passing therethrough to approximately 300° F. may be employed.

At the opposite side of the valve 18 from the blower 21, the drying tube 19 leads to a collector 22, which is similar to the collector 11 and has an air exhaust tube 23 at the top thereof.

The drying tube 19 is preferably about 30 feet in length between the valve 18 and the collector 22, and we have found it to be advantageous to use a tube having a diameter of approximately 6 inches although it will be understood that both the length and the diameter of the drying tube 19 may be varied within rather broad limits.

A rotary valve 24 is provided at the tapered base of the collector 22 and supplies powder therefrom into a cooling tube 25 which leads into a collector 26.

At the opposite side of the rotary valve 24 from the collector 26, the cooling tube 25 is connected to a blower 27 which in turn draws air from an air cooler 28, the blower 27 being preferably of the centrifugal type and the air cooler 28 would consist normally of an enclosed chamber with cooling coils and fins therein of the usual type (not shown) through which the air must pass to enter the blower 27.

The cooling tube may be approximately 15 feet in length and may have a diameter of about 4 inches although these dimensions may be varied if desired.

The collector 26 has an air exhaust 29 at the top thereof and a rotary valve 30 at the bottom into which the product passes after being processed in the heretofore described system of facilities.

In operation, the blower 12 is started and the steam valve 16 is opened to deliver steam and air through the opening 14 and through the blower 12 to the moistening tube 10. The flow of steam should be adjusted to achieve sufficient humidity in the air passing through the moistening tube 10 so that powder introduced into the tube 10 and passing therethrough will absorb sufficient moisture from the air to cause the particles to become tacky and for clusters. The amount of humidity required will depend, of course, on the degree of dryness of the milk powder supplied to the moistening tube 10, the quantity thereof with respect to the air passing through the tube 10, the dimensions of tube 10, and the velocity and temperature of the air passing therethrough.

We have found that ordinary dry milk powder passing at the rate of 500 pounds per hour through a moistening tube 10 which is 25 feet long and 12 inches in diameter requires air having relative humidity in the range of 60 to 70 percent at 150° F., although it will be understood that the percent of humidity and the temperature of the air in the moistening tube may be varied within rather broad limits. The humidity may be tested by providing an opening (not shown) in the moistening tube 10 near the collector 11 through which wet and dry bulb thermometers may be inserted to make the tests.

The adjustment of valve 16 to increase or decrease the proportion of steam being introduced into the moistening tube 10 can best be made, especially when the system is new or when a different product is being processed, by placing the entire system in operation and then checking the moisture and clumping characteristics of the product discharged at the rotary valve 30 from the final collector 26.

After the blower 12 has been placed in operation, the air heater 20 and the blower 21 should be started. The air is preferably heated to nearly 300° F., although the velocity of air passing through the tube may require variation in the temperature. For example, if the air passes more rapidly through the tube, a higher temperature might be required, whereas when the air passes more slowly or if the tube is of greater length, a lower temperature is required.

The air cooler 28 and the blower 27 are then placed in operation and the principal requirement of the air discharged by the blower 27 into the cooling tube 25 is that the temperature be cool enough to reduce the temperature of the powder passing therethrough to below 110° F. In the winter when cool air is readily available from outdoors, it may not be necessary to use the air cooler if cool outside air is introduced through the blower 27 to the cooling tube 25.

When the blowers 12, 21, and 27 and the steam line 15, the air heater 20, and the air cooler 28 have been regulated as described to produce the preferred conditions in tubes 10, 19, and 25, dry milk powder is then introduced from the source 13 into the moistening tube 10 where, because of its hydroscopic character, the powder absorbs moisture from the humid air in the moistening tube 10 and is discharged into the collector 11 with a moisture content of approximately 14 percent. As the particles of powder pass through the moistening tube 10 and increase their moisture content, they become slightly tacky and various particles tend to stick together to form clusters. We have operated our invention with clusters discharging from the moistening tube ranging from 8 to 18 percent moisture, but we find the process works best at 14 percent moisture.

We normally operate our invention so that temperature in the moistening tube 10 is 190° F., but we have obtained satisfactory clustering at temperatures ranging from 75 to 200° F. when the percent of relative humidity has been adjusted properly so that good clustering occurs. At 14 percent moisture, however, milk clusters are not in a commercially desirable form because with that much moisture the clusters will not remain individual and the keeping quality is impaired.

Accordingly, the clusters are passed through the drying tube 19 in which the moisture content is reduced by hot air to somewhere in the vicinity of 3 or 4 percent. The product discharged into the collector 22 is then so warm, however, that the proteins therein would tend to become insoluble if it were not cooled promptly. Accordingly, the product is passed directly into the cooling tube 24 where it is cooled to approximately room temperature or a little warmer, but preferably below 110° F.

When the system has been placed in operation and the dry milk powder is being fed from the source 13 to the moistening tube 10, it is important to make a check of the characteristics of the product discharged through the valve 18 to make sure that the system is properly adjusted to produce the desired product clusters. If the product is dusty at valve 18 and clusters are quite small, it is an indication that the humidity of the air passing through the moistening tube 10 is too low. The steam valve 16 should then be adjusted to admit more steam to the moistening tube 10.

Conversely, if the product were coming out at the valve 18 too high in moisture causing fairly large, doughy clusters, it would be an indication that the air passing through the moistening tube 10 was too humid. In that event, it would be necessary to reduce the flow of steam to the tube 10 by partially closing the valve 16.

If the clusters are high in moisture as they emerge through the rotary valve 30, but if otherwise they appear to be of about the desired size, it may be necessary to increase the heat of the air heater 20 so as to increase the drying effect in the drying tube 19. Or, where the clusters are of about the right size but are too low in moisture and may be slightly parched, the heater 20 may be set too high, in which case the temperature would be reduced.

The velocity of air passing through the drying tube 19 and cooling tube 25 should be just sufficient to carry or convey the clustered non-fat milk solids or the like, but should not be so great as to break up the clusters.

Our invention has been shown in diagrammatic form and the essential features both of the process and of the system of apparatus have been described. It should be understood, however, that numerous modifications can be made both in the apparatus and in details of the process without departing from our invention.

For example, we have described the product to be treated as non-fat dry milk solids although both the apparatus and the process can be used in connection with dry whole milk and with other relatively hygroscopic products, and products with fine particles that may be more wettable when clustered.

We have shown the steam as being introduced from the steam pipe 15 into the opening 14 at the side of the blower 12 but the steam may, of course, be introduced directly into the moistening tube near the discharge of the blower 12 and may also be introduced at numerous points along moistening tube 10.

The exhaust hot drying air is shown discharging to the atmosphere 23, although it may also be directed to the intake opening 14 of the blower 12 to provide heat to the moistening tube 10.

In the diagrammatic representation of our system of apparatus, we have shown rapid drying of moist clusters, which produces hygroscopic, easily dispersible, dry clusters of good flavor.

We desire to make clear that both the system of apparatus and the process are versatile and subject to considerable variation within the contemplation of our invention, the scope of which is to be determined by the appended claims.

We claim:

1. Apparatus for clustering finely divided particles and drying same comprising the combination of an elongated clustering tube, an elongated drying tube, a first blower at one end of the clustering tube and a second blower at one end of said drying tube for circulating air through said tubes, a first cyclone collector with which the end of the clustering tube remote from the first blower communicates tangentially, said first collector having a discharge portion communicating with said drying tube adjacent the second blower, a feed communicating with said clustering tube adjacent the upwind end thereof, regulable means for introducing steam into said clustering tube upwind from said feed, and a second cyclone collector with which the end of the drying tube remote from the second blower communicates tangentially.

2. Apparatus for clustering finely divided particles and drying same comprising the combination of an elongated clustering tube, an elongated drying tube, a first blower at one end of the clustering tube and a second blower at one end of said drying tube for circulating air through said tubes, a first cyclone collector with which the end of the clustering tube remote from the first blower communicates tangentially, said first collector having a discharge portion communicating with said drying tube adjacent the second blower, a feed communicating with said clustering tube adjacent the upwind end thereof, regulable means for introducing steam into said clustering tube upwind from said feed, and a second cyclone collector with which the end of the drying tube remote from the second blower communicates tangentially, said first collector being provided with an elongated exhaust duct remote from the discharge portion thereof, said duct at end remote from the first collector, communicating with said first blower.

3. Apparatus for the manufacture of clusters of dried milk comprising two elongated tubes, means for circulating a stream of relatively humid air through the first tube, means for circulating a stream of relatively hot air through the second tube, a feeder to supply dry milk particles to the stream of humid air in the first tube adjacent its upwind end, a collector at the downwind end of the first tube to receive the humid air and air borne clusters therefrom and to separate said clusters from the humid air, said collector communicating with the second tube adjacent its upwind end to supply clusters to the stream of hot air, and a collector at the downwind end of the second tube to collect said clusters.

4. The method of producing readily dispersible clusters of substantially unhydrated lacteal particles which comprises the steps of introducing relatively unhydrated lacteal particles into circumferentially enclosed stream of relatively humid air, superficially moistening such particles in said air stream to cause surface tackiness, passing said particles through cyclonic air flow in which particles tend to collide and adhere to form clusters, quickly transferring said clusters to a circumferentially confined stream of warm dry air before appreciable hydration occurs, and quickly transferring said clusters to a cooling zone.

5. The method of producing readily dispersible clusters of substantially unhydrated lacteal particles which comprises the steps of conveying substantially unhydrated lacteal particles into a confined linear stream of partially humid air, then discharging said particles with said stream of air tangentially into a cyclonic air flow to separate the particles from said stream of air, said particles being superficially moistened and caused to collide and adhere in said cyclone air flow to form clusters in said steps, and immediately transferring the clusters thus formed from the cyclonic air flow to a confined linear stream of relatively warm air for immediate removal of moisture from said clusters.

6. Apparatus for the manufacture of clusters of dry particles comprising two elongated tubes, means for circulating a stream of relatively humid air through the first tube, means for passing a stream of relatively hot air through the second tube, a dry particle feeder connected to the first tube adjacent its upwind end, a first collector connected to the first tube at its downwind end, said first collector being provided with humid air removal means, said first collector also being connected to the second tube adjacent its upwind end to supply clusters of particles thereto, and a second collector connected to the second tube at its downwind end, said second collector being provided with hot air removal means.

7. The method of producing clusters of discrete dry particles which comprises the steps of introducing such particles into an elongated stream of relatively humid air, superficially moistening such particles in said air stream to cause surface tackiness sufficient to cause the particles to adhere together upon contact to form clusters, passing such clusters through a separating zone in which humid air is removed, quickly transferring said clusters to an elongated stream of warm, dry air, passing said clusters through a separating zone in which warm air is removed, and quickly transferring said clusters to a cooling zone.

8. A product made by the method of claim 7.

References Cited in the file of this patent

UNITED STATES PATENTS

| | | |
|---|---|---|
| 1,928,135 | Peebles et al. | Sept. 26, 1933 |
| 2,016,592 | Chuck | Oct. 8, 1935 |
| 2,088,606 | Peebles et al. | Aug. 3, 1937 |
| 2,174,734 | Chuck | Oct. 3, 1939 |
| 2,832,686 | Louder et al. | Apr. 29, 1958 |
| 2,835,586 | Peebles | May 20, 1958 |

UNITED STATES PATENT OFFICE

CERTIFICATE OF CORRECTION

Patent No. 2,934,434            April 26, 1960

Grant H. Hartman et al.

It is hereby certified that error appears in the printed specification of the above numbered patent requiring correction and that the said Letters Patent should read as corrected below.

Column 3, line 32, for "for clusters" read -- form clusters --; column 6, line 7, after "into" insert -- a --.

Signed and sealed this 20th day of September 1960.

(SEAL)
Attest:
KARL H. AXLINE
Attesting Officer

ROBERT C. WATSON
Commissioner of Patents